Feb. 8, 1927.
A. DITTLINGER ET AL
1,616,529
ELECTRIC LIQUID QUANTITY INDICATOR
Filed Feb. 18, 1924    2 Sheets-Sheet 1
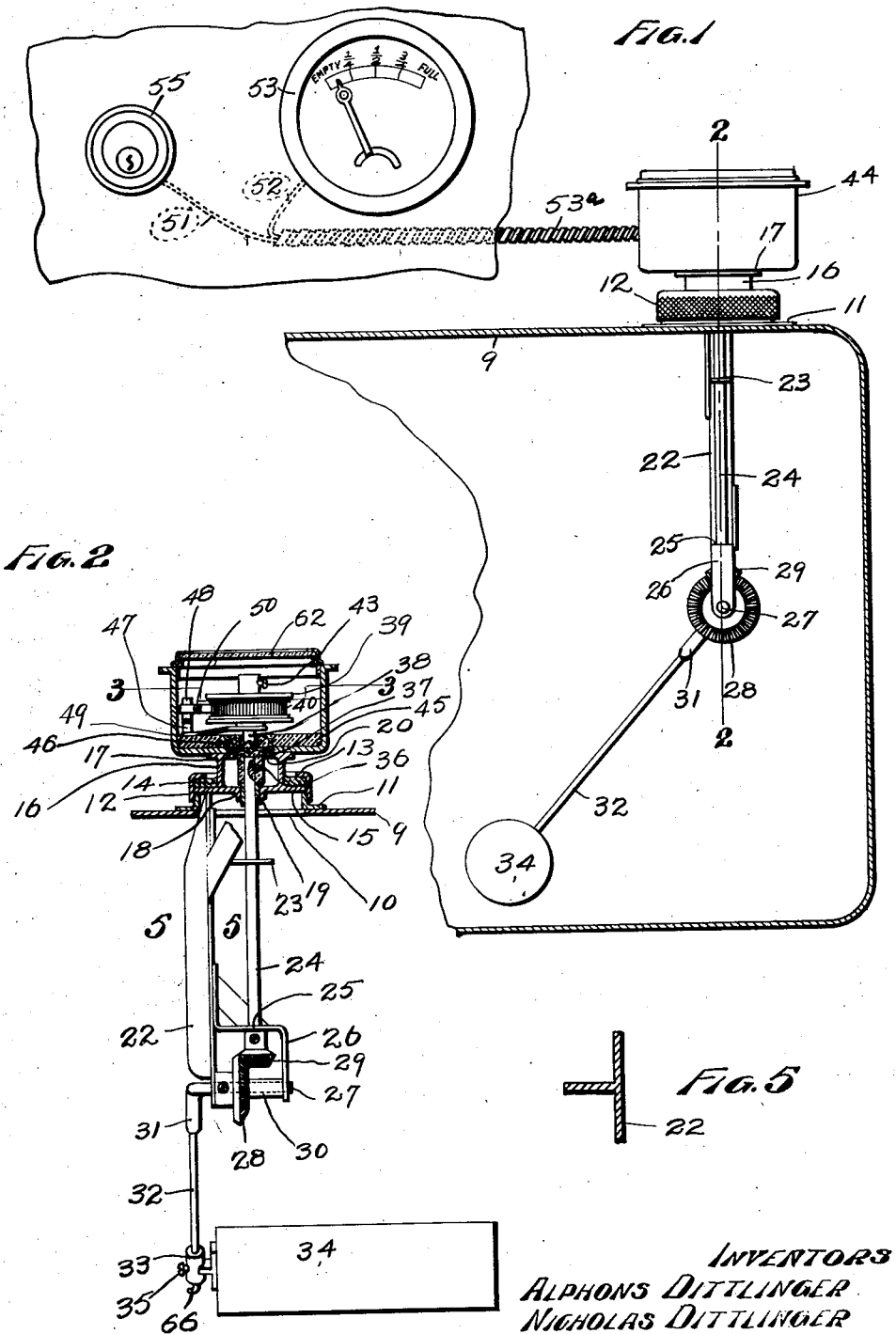
INVENTORS
ALPHONS DITTLINGER
NICHOLAS DITTLINGER
EMIL V. DITTLINGER JR.
BY Edward E. Longan
ATTY.

Feb. 8, 1927. 1,616,529
A. DITTLINGER ET AL
ELECTRIC LIQUID QUANTITY INDICATOR
Filed Feb. 18, 1924    2 Sheets-Sheet 2
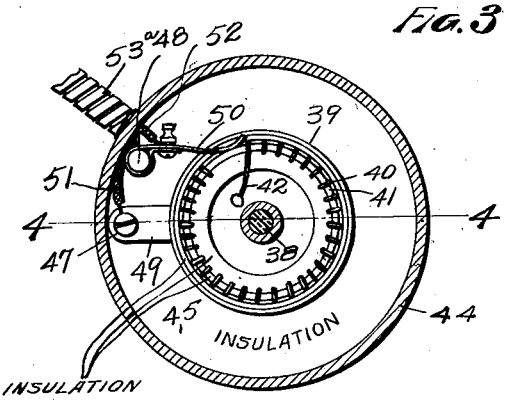
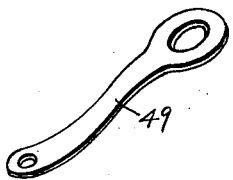
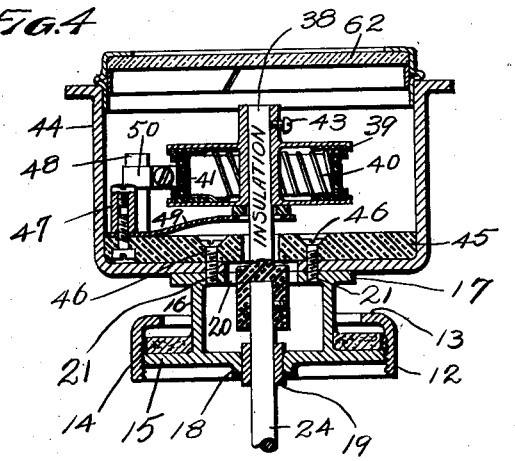
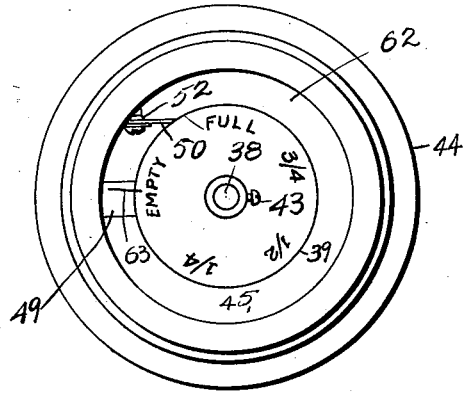
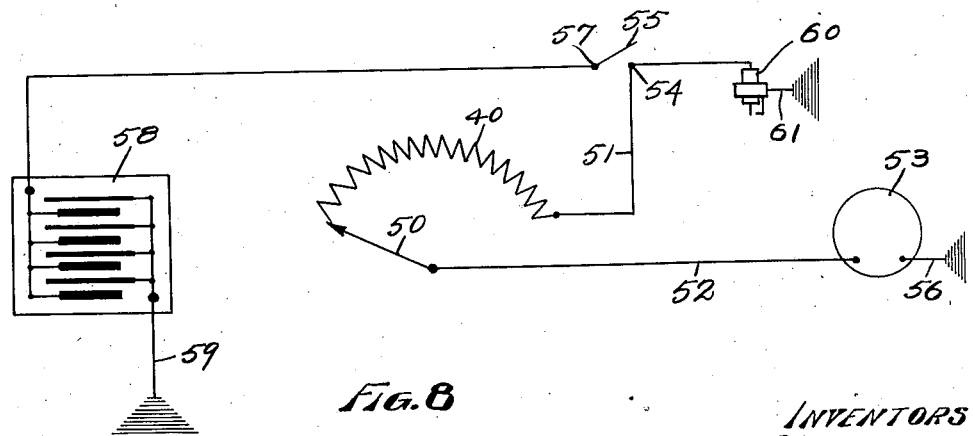
INVENTORS
ALPHONS DITTLINGER
NICHOLAS DITTLINGER
EMIL V. DITTLINGER JR.
BY Edmund E. Longan
ATTY.

Patented Feb. 8, 1927.

1,616,529

UNITED STATES PATENT OFFICE.

ALPHONS DITTLINGER, NICHOLAS DITTLINGER, AND EMIL V. DITTLINGER, JR., OF ST. LOUIS, MISSOURI.

ELECTRIC LIQUID-QUANTITY INDICATOR.

Application filed February 18, 1924. Serial No. 693,692.

Our invention relates to improvements in electric liquid quantity indicators and has for its primary object an electrically operated device which will indicate the quantity of liquids in a container.

A further object is to construct an electrically operated quantity indicating device which will indicate the amount of liquid in the container and which is so constructed that the indication can be ascertained at will so that a constant use of electric current is unnecessary.

A still further object is to construct a quantity indicating device which is especially applicable to automobiles and which is so designed as to only indicate the quantity of liquid in the fuel tank when the ignition switch is turned on and in this manner a constant drain on the storage battery while the machine is idle, is eliminated.

In the drawings:—

Fig. 1 is a fragmental view of the fuel tank of an automobile and the instrument board showing my device in position;

Fig. 2 is a sectional view taken on the line 2—2 of Fig. 1;

Fig. 3 is an enlarged horizontal view of the current regulating device taken on the line 3—3 of Fig. 2;

Fig. 4 is a vertical section taken on the line 4—4 of Fig. 3;

Fig. 5 is an enlarged section of the support taken on the line 5—5 of Fig. 2;

Fig. 6 is an enlarged perspective view of the bottom contact brush employed;

Fig. 7 is a top plan view of the current controlled member; and

Fig. 8 is a diagrammatic view showing the connections.

In the construction of our device we employ a liquid tank 9 which is provided with an opening 10, preferably on its top. Secured to the tank and surrounding the opening 10 is a screw threaded flange 11. Secured over the flange 11 is a screw threaded collar 12 which is provided with an inturn portion 13. This inturn portion is adapted to rest on a gasket or washer 14 which is preferably of resilient material. Resting on the flange 11 or rather its upper edge is a disk 15 which is provided with a cylindrical extending portion 16 terminating in a flange 17. The disk 15 is provided with a lipped or flanged opening 18 into which a sleeve or bushing 19 is pressed. The flange 17 is provided with an opening 20, which opening is concentric with the opening 18 and bushing 19. The flange 17 is also provided with screw threaded openings 21, the purpose of which will be explained in detail later.

Secured to the disk or plate 15 is a support 22, which is preferably T shaped in cross section (see Fig. 5); this T shaped construction is for rigidity. Secured to the support 22 is a bracket 23 which is provided with an opening to receive the shaft 24. Adjacent the lower end of the support 22 is a bracket 25 which is likewise provided with an opening through which the shaft 24 extends. The bracket 25 is also provided with a downwardly extending portion 26 which is parallel to the support 22. This downwardly extending portion, as well as the lower portion of the support 22, are provided with openings through which a rod 27 passes, these openings forming bearings for the rod. The rod 27 is L shaped and has mounted on that portion between the support 22 and portion 26 a bevel gear 28 which meshes with a bevel gear 29 carried by the lower end of the shaft 24. Surrounding the rod 27 is a sleeve 30; the purpose of this sleeve is to eliminate any possibility of end play in the rod 27. In other words, its purpose is to prevent the gears 28 and 29 from binding.

Secured to the end 31 of the rod 27 is a rod 32; this rod is preferably of less diameter than the end 31 and is secured thereto by welding, although the end 31 may be drawn down to the smaller diameter if desired. The rod 32 passes through a bracket 33 which is secured to a float 34 in any well known manner. The bracket 33 is secured to the rod 32 by means of a screw 35. This screw securing means permits the float 34 to be adjustably secured to the rod; the purpose of this adjustable securing will be explained in detail later.

Secured to the upper end of the shaft 24 by means of a set screw 36 is an insulating shaft 37. This insulating shaft may be constructed of any well known insulating material, such as hard rubber and the like, and is provided with a reduced portion 38 to which is attached a rheostat 39. This rheostat may be of any of the well known barrel types such as are used in radio work and consists of a cylindrical coil of wire 40 wound around a cylinder 41, the whole being supported but insulated from the metallic plates which form the top and bottom of the rheostat, with the exception that the end 42 of the coil 40 is attached to the bottom plate. The rheostat 39 is secured to the reduced end of the insulating shaft 37 by means of a screw 43. The rheostat is mounted in a housing 44 which is cup shaped and has resting on its bottom an insulating plate 45. Extending through this plate, the bottom of the housing 44 and into the flange 17 are screws 46 by means of which the cup and housing 44 are secured to the plate 15. Carried by the insulating plate 45 are binding posts 47 and 48, the binding post 47 connecting with the bottom contact brush 49 which contacts with the bottom plate of the rheostat and permits electric energy to pass into the end 42 of the coil 40. Secured to the post 48 is a contact brush 50 which contacts with the coil 40 and as the rheostat revolves delivers a current to the indicator and gradually decreases the resistance. Secured to the binding post 47 is an electrical conductor 51 and secured to the brush 50 is a conductor 52; both these conductors are preferably inserted through a flexible conduit 53^A secured to the housing 44. This conduit is mainly for the protection of the insulation around the conductors 51 and 52. The conductor 51 is secured to the post 54 of a switch 55, while the conductor 52 is connected to one post of the indicator 53, the other post of the indicator being grounded as at 56. The post 57 of the switch 55 is connected to one terminal of any suitable source of electrical energy 58, in this instance a storage battery, the other terminal being grounded as at 59.

It will be noted from Fig. 8 that we have shown our device as connected in the ignition system of an automobile and in which 60 represents the spark plug and 61 the grounded portion of the plug.

The installation and operation of our device is as follows:—

After that portion of the device which fits into the liquid tank has been assembled, with the exception of the float, and the depth of the tank measured, the float is adjusted on the rod 32 to such a position that when the tank is emptied, the rheostat will be in the position shown in Fig. 3, and when in its highest possible position or when the tank is full, be revolved sufficient to contact with the last coil of the rheostat, or in other words cut out all resistance. The screw 35 is then tightened and the rod 32 cut off leaving however the portion 66 which may be bent over so as to prevent any possibility of the float sliding off of the rod 32 in the event that the screw 35 becomes loosened. The wire or conductor 51 is then attached to one pole of an electric switch and the source of electrical energy to the opposite pole. The conductor 52 is attached to one pole of the indicator and the other pole of the indicator grounded or so connected that a complete electric current will be established on closing of the switch.

When the tank is completely empty the contact brush 50 will be on the neutral point of the rheostat, and when the circuit is closed nothing will be indicated on the indicator. As liquid is poured into the container the float commences to rise and operates the gear mechanism thus rotating the shaft and operating the rheostat. As the float rises the resistance in the rheostat is gradually lessened and the hand of the indicator advances thus indicating the amount of liquid in the container. Upon operating the switch 55 and cutting off the current the indicator hand naturally falls back to zero but as soon as the electric circuit is re-established the device at once functions and properly indicates the amount of liquid in the tank.

This may be done either as illustrated in the drawings, to indicate—empty, one-fourth, one-half, three-fourths or full—or to indicate the amount of gallons; however for general purposes the indication shown meets all requirements.

An essential feature of our device is that its action is in no way affected either by temperature changes or absorption of gases and is consequently accurate under all conditions of temperature.

We may if desired place a glass plate 62 over the housing 44 and provide said plate with a line 63 and mark the top of the rheostat to correspond with the graduation on the indicator 53 so that the quantity of liquid in the container may be ascertained at more than one place.

Our device is especially useful on automobiles because the indicator can be mounted on the dash-board and the simple turning on of the ignition switch will at once indicate the amount of fuel in the tank, this indication continuing as long as the switch is turned on so that the driver of a motor vehicle can readily determine the amount of fuel in his tank as he is traveling along the road and at the same time when the vehicle is stopped and the ignition turned off no drain on the battery will result, due to the fact that the indicator is automatically disconnected from the source of electrical energy by the stopping of the engine.

Our device is also extremely useful in filling stations because the indicator can be mounted in the filling station and the mere turning of a switch will notify the attendant as to the quantity of motor fuel in his underground tank thus obviating all necessity of measuring sticks.

It is to be further noted that all of the electrical connections in our device are well insulated and entirely removed from any possible contact with gasoline fumes, so that even should a spark result at any of the connections, there will be no danger of ignition of gases.

While we have shown the rheostat as rotating still it is obvious that the rheostat could be held against rotation and the contact brush 50 arranged to be rotated by the float mechanism without in any way departing from the spirit of our invention; and that we may also substitute what is commercially known as a potentiometer in place of the ordinary rheostat. The purpose however, of using this potentiometer is merely to give a more accurate or finer regulation of voltage to the indicator, this extremely fine regulating being especially desired where the quantity in gallons such as most probably would be used for filling stations, is to be indicated.

It is to be understood of course that our indicator will be so constructed as to take care of various voltages in the case of filling stations and similar places; the indicator can be constructed for the voltage of the light circuit while in the case of motor vehicles the indicator will be constructed for the voltage of the battery or magneto.

We may also if desired construct our device so as to work the reverse of the manner described, or in other words, carry the full voltage of the current to the indicator when the tank is empty or gradually reduce it as the tank becomes filled, without departing from the spirit of our invention.

Having fully described our invention, what we claim is:—

1. A device of the class described comprising a plate, a frame secured to one face of said plate, a rod pivotally mounted in said frame adjacent its lower end, a float slidably mounted on said rod, means for holding said float against accidental sliding, a shaft supported by said frame and extending through said plate, gears secured to said rod and shaft and meshing with each other whereby said shaft is rotated when the float rises and falls, a housing secured to the face of said plate opposite that to which the frame is secured, an insulating shaft secured to the first mentioned shaft and extending into said housing, and a rheostat located within the housing and secured to said insulating shaft.

2. A device of the class described comprising a plate having a central opening, a bushing secured in said opening, a flanged cylindrical projection integral with one face of said plate and concentric with said opening, a frame secured to the opposite face of said plate, an L shaped shaft pivotally mounted in said frame adjacent its lower end, a slidable float located on said rod, means for securing said float to said rod, means for retaining the float on the rod in event the securing means becomes accidentally loosened, a shaft supported by said frame, said shaft extending through said bushing, an insulating shaft secured to the first mentioned shaft and extending upward therefrom, a housing secured to said flanged cylindrical projection and surrounding the insulating shaft, a rheostat carried by said last mentioned shaft and located within said housing, and means carried by said shaft and rod whereby said shaft is rotated when the float rises and falls.

In testimony whereof, we have signed our names to this specification.

ALPHONS DITTLINGER.
NICHOLAS DITTLINGER.
EMIL V. DITTLINGER, Jr.